Oct. 18, 1966 D. VON SANDEN ETAL 3,280,265

SWITCHING ARRANGEMENT FOR A MULTIPLEX TELEPHONE SYSTEM

Filed March 29, 1963 2 Sheets-Sheet 1

SWITCHING ARRANGEMENT FOR A MULTIPLEX TELEPHONE SYSTEM

Filed March 29, 1963 2 Sheets-Sheet 2

3,280,265
Patented Oct. 18, 1966

3,280,265

SWITCHING ARRANGEMENT FOR A MULTIPLEX TELEPHONE SYSTEM

Dieter Von Sanden, Munich-Solln, and Max Schlichte, Munich, Germany, assignors to Siemens & Halske Aktiengesellschaft, Berlin and Munich, Germany, a corporation of Germany Filed Mar. 29, 1963, Ser. No. 269,207
Claims priority, application Germany, Apr. 2, 1962, S 78,786
7 Claims. (Cl. 179—15)

Figure 1:
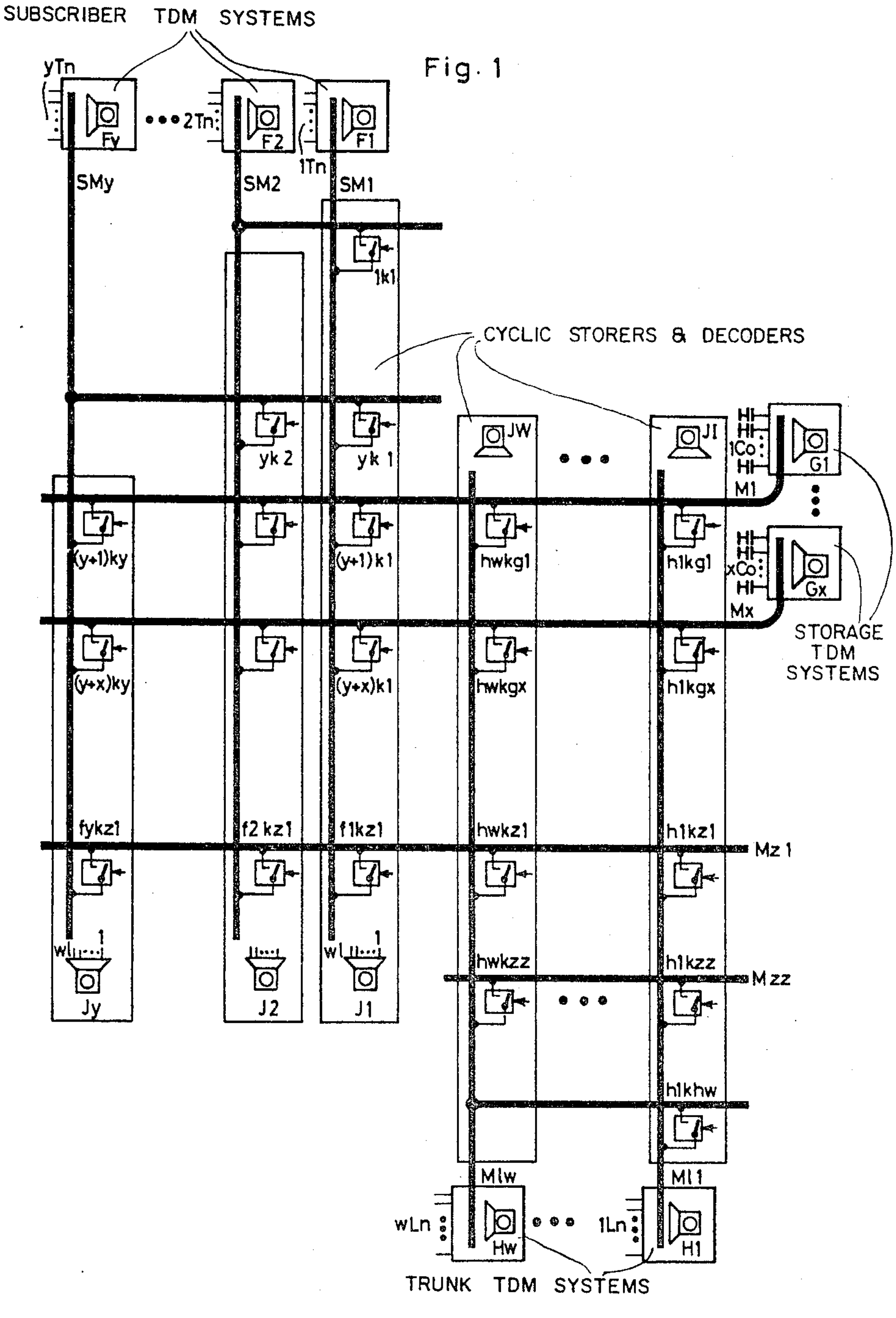

The invention disclosed herein is concerned with an improved switching arrangement for a time-division multiplex telephone system, which is particularly applicable to the system described in copending application Serial No. 205,402, filed June 26, 1962.

The copending application relates to a switching arrangement over which is conducted the traffic of a plurality of time-division multiplex telephone communication systems, each of which comprises a telephone multiplex line common for outgoing and incoming traffic, to which the subscribers of the respective system are connected periodically in impluse-like fashion by means of speech or call switches. This switching arrangement is constructed as a coupling multiple, also termed cross-wire multiple, and briefly referred to as coupler, which has, per combination pair of such multiplex telephone lines, a coupling point contact so that over said coupling point contacts, traffic can be conducted between different time-division multiplex telephone communication systems, specifically by pulse-wise closing of the coupling point contact which is connected to the telephone multiplex lines involved in a call, as well as coupling point contacts per combination pair of a telephone multiplex line and a multiplex line of special time-division multiplex communication systems which have speaking energy storers instead of subscribers, which can be connected twice per cycle to their multiplex line so that traffic within the time-division multiplex telephone communication systems is also possible, and so that in all of these cases of operation at all times only one speech or call switch need be actuated at the same time in the respective systems, since the speech energy storers in known manner bridge over the time interval between the instants of the closure of the speech switches associated with the subscribers to be connected, for the exchange of energy between said subscribers.

In the copending application, there has been indicated a certain supplementation of this switching arrangement as a result of which the coupler has additional coupling point contacts which belong to combination pairs of multiplex lines which are formed in each case of one of the said telephone multiplex lines and a special multiplex line of time-division multiplex communication systems, to which there are connected, instead of subscribers, trunk lines leading to other central exchanges or the like, for outgoing and/or incoming traffic, for the handling of which such additional coupling point contacts are in each case closed in a pulse-like manner. After such a supplementing of the switching arrangement, not only can traffic be effected within and between the individual time-division multiplex telephone communication systems of a central exchange, but traffic can also be effected between the subscribers of the individual time-division multiplex telephone communication systems of the exchange in question and other exchanges over lines connected therewith. The switching arrangement described in the copending applica tion is suitably supplemented in the indicated manner in particular when the incoming and outgoing traffic between the lines leading to other central exchanges or the like and the subscribers of the time-division multiplex telephone communication systems combined by a coupler into one exchange is relatively heavy. This will be the case in particular when there are connected to the other time-division multiplex telephone communication systems having lines leading to other exchanges, only lines which actually lead to other exchanges, in which connection these lines are to be connected for all practical purposes only with subscribers of the time-division multiplex telephone communication systems, while indirect traffice between various such outside exchanges occurs only to a relatively slight extent.

It may however be advisable to supplement the switching arrangement described in the copending application in a different manner in order to be able to conduct not only traffic within and between the individual time-division multiplex telephone communication systems of one exchange, but also traffic between the subscribers of the individual time-division multiplex telephone communication systems of the exchange in question and other time-division multiplex telephone communication systems to which are connected lines leading to other exchanges or the like. Such a supplementation forms the subject matter of the invention described below.

The invention thus relates to a switching arrangement via which the traffic of a plurality of time-division multiplex telephone communication systems, each having a telephone multiplex line to which the subscribers of the corresponding system are connected in pulse-wise manner periodically by means of speech switches, is conducted, which switching arrangement is constructed as coupler provided with coupling point contacts associated in each case with a combination pair of telephone multiplex lines of such communication systems for conducting the traffic between various ones of such systems, and associated in each case with a combination pair of one such telephone multiplex line and a multiplex line of special time-division multiplex communication systems which have speech energy storers instead of subscribers. The particular features of this switching arrangement reside in the provision, in the coupler, of additional coupling point contacts which are connected in each case with one terminal to one of the telephone multiplex lines of the time-division multiplex telephone communication systems, and with their other terminal in common to a special multiplex line, as well as further additional coupling point contacts which are connected in each case with one terminal in common to such a special multiplex line, and with their other terminal individually to one of the multiplex lines of additional time-division multiplex telephone communication systems which instead of subscribers have trunk lines leading to other exchanges or the like, for outgoing and/or incoming traffic, over which further coupling point contacts this traffic can be conducted by pulse-wise closing of the respective coupling point contacts, to establish connections between the multiplex lines involved in given cases.

The switching arrangement in accordance with the invention is advantageous, particularly in cases in which the traffic between the time-division multiplex telephone communication systems and the additional time-division multiplex communication systems having trunk lines leading to other exchanges or the like is not particularly heavy. This is true, for instance, when there are connected to such additional time-division multiplex communication systems not only trunk lines leading to other exchanges but, for example, also lines of special subscribers or the like, which are not connected to one of the ordinary time-division multiplex telephone communication systems of the respective exchange, or if a relatively heavy through traffic occurs between different lines leading to other exchanges. For traffic between the time-division multiplex telephone communication systems and the additional time-division multiplex communication systems having lines leading to other exchanges or the like, there is then required, according to the invention, only a relatively small number of coupling point contacts, since connections can be made over such special multiplex line, in each case between two such communication systems of any desired combination, and, accordingly, special multiplex lines and corresponding coupling point contacts, such as necessary for the carrying out of the traffic between the time-division multiplex telephone communication systems and the additional time-division multiplex communication systems having lines leading to other exchanges or the like, need no longer be provided.

The invention will now be explained in further detail with reference to the accompanying drawings, wherein FIG. 1 shows a switching arrangement including features also shown in FIG. 3 of the copending application and further features of the present invention; and FIGS. 2*a* to 2*d* show various arrangements of coupling point contacts.

FIG. 1 shows essential parts of the switching arrangement also shown in FIG. 3 of the copending application, so that the fundamental construction of the switching arrangement can be noted therefrom. The switching arrangement which is constructed as a couplor, comprises coupling coupling point contacts 1*k*1 . . . *yk*2 . . . . These coupling point contacts are in each case connected to two of the multiplex lines SM1 . . . SM*y* of the systems F1 . . . F*y*, so that one such coupling point contact is associated with each combination pair of said multiplex lines. Over these coupling point contacts 1*k*1 . . . *yk*2 . . . the traffic is conducted between subscribers 1T*n* . . . *y*T*n* of different such systems F1 . . . F*y*. The coupler furthermore has coupling point contacts $(y+1)k1 \ldots (y+x)ky$ which are, by connection to corresponding multiplex lines, associated in each case with a combination pair of a telephone multiplex line SM1 . . . SM*y* and a multiplex line M1 . . . M*x* of special systems G1 . . . G*x*, which have speech energy storers 1C*o* . . . *x*C*o* instead of subscribers; these coupling point contacts serve to handle the traffic within the individual systems F1 . . . F*y*. The individual switching parts are referenced in FIG. 1 in the same way as corresponding parts appearing in the copending application, and further details with respect thereto are therefore omitted as they may be obtained from the copending application.

In accordance with the invention, the coupler is provided with additional coupling point contacts shown in FIG. 1. These additional coupling point contacts are contacts which, like the coupling point contacts *f*1*kz*1 . . . *fykz*1, are connected in each with one terminal individually to one of the multiplex lines SM1 . . . SM*y* of the systems F1 . . . F*y*, and with their other terminal in common to a special multiplex line M*z*1, as well as coupling point contacts which, like coupling point contacts . . . *h*1*kz*1 . . . *hwkz*1, are connected in each case with their one terminal in common to one such special multiplex line M*z*1 and with their other terminal individually to one of the multiplex lines M1 . . . M1*w* of further systems H1 . . . H*w* which have trunk lines 1L*n* . . . *w*L*n* for outgoing and/or incoming traffic leading to other central exchangers or the like. The special multiplex line M*z*1 therefore crosses the multiplex lines SM1 . . . SM*y* of the systems F1 . . . F*y*, and also the multiplex lines M*l*1 . . . M*lw* of the additional systems H1 . . . H*w* having trunk lines leading to other exchangers or the like, there being located at the crossing points the coupling point contacts by means of which, in each case, a connection can be made between two crossing multiplex lines. If desired, there can also be provided further such special multiplex lines (not shown) which cross the multiplex lines of all communication systems.

The handling of the traffic between the systems F1 . . . F*y* and the additional systems H1 . . . H*w*, having lines 1L*n* . . . *w*L*n* leading to other exchangers or the like, takes place in the following manner:

If, for instance, a connection is to be made between a subscriber of the subscriber group 1T*n* of the system F1 and a line of the line group 1L*n* of the additional system H1, the speech or call switch associated in the system F1 with the corresponding subscriber is periodically actuated in pulse-wise manner, by a control pulse, as a result of which the corresponding subscriber is connected periodically in pulse-wise fashion to the multiplex line SM1. The control pulse causing the actuation of the speech switch, has a specific phase relationship which differs from the phase relationships of control pulses associated with other subscribers of the same system F1. Synchronously with the actuation of the speech switch associated with the said subscriber, a coupling point contact leading to a special multiplex line is now also periodically closed in pulse-like manner, for instance the coupling point contact *f*1*kz*1 leading to the special multiplex line M*z*1. In this way, the multiplex line SM1 is connected with the special multiplex line M*z*1. At the same pulse phase, there is also closed the coupling point contact *h*1*kz*1 which leads from this special multiplex line M*z*1 to the multiplex line M*l*1 of the system H1. As a result, there is produced a pulse-wise periodic connection between the multiplex line SM1 of the system F1 and the multiplex line M*l*1 of the system H1. The desired connection is established by cycling, in a cyclic storer of the system H1, the address of the desired line from the line group 1L*n*, thereby producing the control pulses for actuating the speech switches of the system, the cycling being effected in such a manner that the resultant control pulse for the speech switch leading to the system H1 has the same phase relationship as the control pulse which controls the speech switch associated with the respective subscriber in the system F1. In order to maintain such a connection, the systems H1 . . . H*w* need in each case have only one cyclic storer, thereby automatically avoiding the undesired use of the same mutliplex line M*l*1 . . . M*lw* for different telephone connections, with control pulses of the same phase relationship.

A plurality of telephone connections can of course exist simultaneously between the system F1 and the additional system H1, requiring merely that the corresponding control pulses have different phase relationships. These telephone connections can then be conducted over the same special multiplex line M*z*1 without causing mutual interference. Connections between other pairs of a system F and another system H can also be made over the same special multiplex line M*z*1 provided that control pulses with different phase relationship are used. If several special multiplex lines are provided, there can even exist simultaneously telephone connections which are maintained by means of control pulses of the same phase relationship, it being in such case necessary to satisfy the condition that they are conducted over different special multiplex lines.

It is also possible to effect in similar manner the traffic between different time-division multiplex communication systems H1 . . . H*w*, having lines 1L*n* . . . *w*L*n* leading to other central exchangers or the like, in which case there are actuated two coupling point contacts having one terminal thereof connected jointly to a special multiplex line and their other terminal connected to the multiplex lines M*l*1 . . . M*lw*, of the corresponding two systems H1 . . . H*w*. In the switching arrangement shown in FIG. 1, there are provided for such handling of the traffic between different systems H, having lines leading to other central exchanges or the like, the additional coupling point contacts *h*1*kzz* . . . *hwkzz*, which are in each case connected with one terminal in common to the special multiplex line M*zz*, and with their other terminal individually to one of the multiplex lines M*l*1 . . . M*lw* of the additional systems H1 . . . H*w*. The handling of the traffic, for instance, between the system H1 and the system H*w* then takes place by conducting a connection over the special multiplex line M*zz* in a manner which fully corresponds to the operations described above relating to establishing a connection between a system F and another system H, in which case the two coupling point contacts *h*1*kzz* and *hwkzz* are synchronously closed periodically in pulse-like manner, for the phase associated with the connection the speech switches involved in the two communication systems H1 and H*w*, the corresponding coupling point contacts being connected to the respectively multiplex lines M*l*1 and M*lw* and to the special multiplex line M*zz*.

In addition to such additional coupling point contacts *h*1*kzz* . . . *hwkzz*, which in each case are connected with their one terminal in common to a special multiplex line M*zz* and with their other terminal individually to one of the multiplex lines M*l*1 . . . M*lw* of the further systems H1 . . . H*w* having lines 1L*n* . . . *w*L*n* connected to other central exchanges or the like, or else instead thereof, there can be provided, in accordance with another feature of the switching arrangement according to the invention, additional coupling point contacts which, like the coupling point contact *h*1*khw*, belong to combination pairs of multiplex lines M*l*1 . . . M*lw* of the additional systems H1 . . . H*w* having lines 1L*n* . . . *w*L*n* leading to other central exchanges or the like, over which coupling point contacts traffic can then be conducted between the corresponding additional systems H1 . . . H*w*. As example of this there is shown in the figure the coupling point contact *h*1*khw*, which is connected to the multiplex line M*l*1 of the system H1 and to the multiplex line M*lw* of the system H*w*. Such a feature is advantageous, as compared with the previously described operations, when the traffic to be handled between two specific additional systems H is relatively heavy, so that, solely as a result of this traffic, a special multiplex line (M*zz*) will be fully loaded, or when there are concerned only relatively a few additional systems H with lines leading to other exchanges or the like. The traffic between two such additional systems H, for instance between the system H1 and the system H*w* is in such case handled in the following manner:

In the system H1 the speech switch of the line, participating in the given connection, included in the line group 1L*n* is periodically closed in pulse-like fashion, so that such line is periodically connected with the multiplex line M*l*1. Synchronously with the actuation of the corresponding speech switch, the coupling point contact *h*1*khw* is also periodically closed in pulse-like manner. There is produced in this manner a corresponding connection between the multiplex lines M*l*1 and M*lw*. The desired telephone connection is effected by cycling the address of the desired line from the group of lines *w*L*n* in the cyclic storer of the system H*w*, doing so in such a manner that the resultant control pulse for the speech switch leading to this second line in the system H*w* has the same phase relationship as the control pulse which controls the speech switch associated with the first line in the system H1. Therefore, in order to maintain this connection, only one cyclic storer is necessary in each of the corresponding systems H.

Several telephone connections can simultaneously exist between two specific systems H1 . . . H*w*, in which case the corresponding control pulses must have different phase relationships. These telephone connections can then be conducted over one and the same coupling point contact without entailing mutual interference. Trunk lines which belong to other pairs of systems H1 . . . H*w* can also be simultaneously connected with each other, since other coupling points are to be actuated for this purpose. There can also simultaneously exist telephone connections which are maintained by means of control pulses of the same phase relationship, it being in such case merely necessary to satisfy the condition that they are conducted over different multiplex lines.

The traffic between trunk lines of one and the same system H1 . . . H*w* can also be handled by means of the above-mentioned cyclic storer provided in such system. For this purpose there are provided in the switching arrangement in accordance with the invention additional coupling point contacts *h*1*kg*1 . . . *hwkgx* over which special systems G1 . . . G*x* can be reached which have speaking energy storer instead of subscribers. Over these coupling point contacts *h*1*kg*1 . . . *hwkgx*, which belong to combination pairs of multiplex lines which consist in each case of a multiplex line M*l*1 . . . M*lw* of a time-division multiplex communication system H1 . . . H*w* with line 1L*n* . . . *w*L*n* leading to other exchanges or the like, and of a multiplex line M1 . . . M*x* of a special system G1 . . . G*x* having speech energy storers 1C*o* . . . *x*C*o*, traffic can also be conducted within the individual systems H1 . . . H*w*. There are in this connection required for one and the same telephone call two control pulses of different phase relationship. If, for instance, two trunk lines of the system H*w* are to be connected with each other, then the addresses of these two trunk lines from the line group *w*L*n* are staggered with respect to each other in the corresponding cyclic storer. Both trunk lines are therefore connected periodically in pulse-like fashion, but at different times to the multiplex line M*lw* via the corresponding speech switch. In order to produce the desired connection, at the two instants the coupling point contact *hwkg*1 is closed in pulse-like fashion so that the multiplex line M*lw* of the system H*w* is connected with the multiplex line M1 of the system G1. In the cyclic storer of the system G1 the address of one and the same speech energy storer must then be cycled twice and specifically in such a manner that two control pulses are supplied for closing the corresponding speech switch, which pulses are of the same phase as the control pulses supplied for this connection in the system H*w*. The speech energy storer used now bridges over, in the manner already described in the copending application, the time intervals which in each case lie between two closings of the speech switches associated with the corresponding trunk lines of the line group *w*L*n* in the system H*w*, so that the intended connection is produced between the two trunk lines of the corresponding system.

Still other pairs of trunk lines of the same line group *w*L*n* of the system H*w* can also be connected with each other without interference, by means of other speech energy storers of the system G1, since for this purpose other control pulses are necessarily employed. Insofar as other pairs of control pulses are used, there can furthermore be connected with each other pairs of trunk lines belonging to other time-division multiplex communication systems (for instance H1), particularly when speech energy storers belonging to the system G1 are used. These connections are of course conducted over other coupling point contacts, for instance over the coupling point contact *h*1*kg*1. Since still further time-division multiplex communication systems having speech energy storers, instead of subscribers, are connected to the coupling switching arrangement shown in FIG. 1, such as for instance the time-division multiplex communication system G*x* there can also even be connected with each other trunk lines, the speech switches of which are controlled by means of control pulses which have the same phase relationship as those which are already used for another connection. These telephone connections are however to be conducted over other multiplex lines so that interference is avoided. This furthermore results automatically since the same pair of control pulses can be delivered in one and the same time-division multiplex communication system only for one speech energy storer, there being only one cyclic storer provided there in such system.

Via the switching arrangement shown in FIG. 1 there can also be extended connections between different communication systems when the corresponding speech switches cannot be actuated synchronously in the two communication systems because no common idle pulse phase is available. In such a case, similar to what has just been described for a connection between trunk lines of one and the same system H1 . . . H*w*, there can be used speech energy storers which bridge over the time intervals which lie in each case between the closure of the two speech switches.

Some explanations will now be given as to how the additional coupling point contacts of the coupler, which are provided in the switching arrangement in accordance with the invention, can be actuated. The coupling point contacts can be actuated with means such as are provided in the copending application for the actuation of the speech switches in the individual time-division multiplex communication systems. Thus, for instance, special cyclic storers can be provided, in which code signals associated with coupling point contacts are cycled as addresses, such signals serving to produce control pulses. These control pulses then effect the periodic pulse-wise closing of the corresponding coupling point contacts. Such cyclic storers can be associated for instance, in each case, with coupling point contacts connected to one and the same multiplex line M*l*1 . . . M*lw*, of one of the additional time-division multiplex communication systems H1 . . . H*w*. In the switching arrangement shown in FIG. 1, there are in this manner associated with the coupling point contacts, devices which are designated JI . . . JW, each containing a cyclic storer with a decoder, and the other parts, not shown. The cyclic storer with decoder belonging to the device JI has, for instance, as many outputs as there are additional coupling point contacts connected to the multiplex lines. Via these outputs, these coupling point contacts of the multiplex line M*l*1 . . . are actuated. Only one coupling point contact connected to such a multiplex line M*l*1 . . . M*l*w is actuated in such case, since simultaneous actuation of more than one such contact would result in connecting different telephone connections together; for the actuation of the additional coupling point contacts connected to a specific multiplex line M*l*1 . . . M*lw* there thus suffices in each case one cyclic storer. The cyclic storer belonging to the device JW is associated in similar manner with the coupling point contacts of the multiplex line M*lw*, in which case coupling point contacts which, like the coupling point contact *h*1*khw*, are connected simultaneously to two such multiplex lines (M*l*1 and M*lw*) and which have already been taken into consideration by a device (for example JI) are operatively ignored. In corresponding manner, the coupling point contacts *f*1*kz* . . . *fykz*1 connected to one and the same special multiplex line Mz1 and to different telephone multiplex lines SM1 . . . SM*y* of the systems F1 . . . F*y* are in each case actuated by one of the devices J1 . . . J*y*, already described in the copending application. However, it is also possible to control the coupling point contacts in another combination, by cyclic storers, for instance, by connecting the coupling point contacts *f*1*kz*1 . . . *fykz*1 to one and the same special multiplex line Mz1 and to different telephone multiplex lines SM1 . . . SM*y* of the systems F1 . . . F*y*, and actuating these contacts by means of code signals which serve as addresses and which are periodically cycled in one and the same cyclic storer, which however has not been specifically shown in FIG. 1. Different coupling point contacts, for instance, the coupling point contacts *fykz*1 and *hwkz*1, which are connected to the same special multiplex line Mz1 are to be closed simultaneously only when they belong to the same call, extending, for instance, between the system F*y* and the system H*w*.

It may also be pointed out that the coupling point contacts which are contained in the switching arrangement shown in FIG. 1, of course, need not always be disposed as simple mechanical or electronic contacts, but that they can be arranged, depending on the technique used, as two-wire or four-wire contacts. In the case of a four-wire development, of the coupling point contact the condition must of course be satisfied that in the connections conducted over such coupling point contacts, between two time-division multiplex communication systems having respectively a four-wire multiplex line, the speech multiplex line of one such system is connected with the receiving multiplex line of the other system and conversely, the speech multiplex line of the other system is connected with the receiving multiplex line of the first system. This will be explained now briefly with reference to FIGS. 2*a* to 2*d* in which different arrangements of the coupling point contacts are shown in single-wire representation.

Figure 2A:
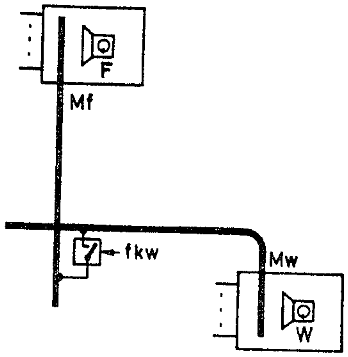

In FIG. 2*a*, there is again shown a 2-wire coupling point contact *fkw* which connects together two crossing 2-wire multiplex lines M*f* and M*w* of two time-division multiplex communication systems F and W having lines leading to subscribers or to other central exchanges or the like.

Figure 2B:
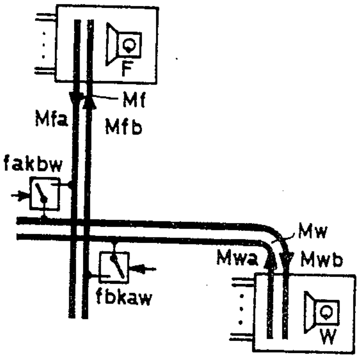

Accordingly, if there are involved two crossing 4-wire multiplex lines of two such systems, the coupling point will be developed in accordance with FIG. 2*b*. At the crossing point of the two 4-wire multiplex lines there is provided here a duo-group of coupling point contacts *fakbw* connects the speech multiplex line M*fa* of the system F with the receiving multiplex line M*wb* of the system W, and the coupling point contact *fbkaw* connects the speech multiplex line M*wa* of the system W with the receiving multiplex line M*fb* of the system F.

Figure 2C:
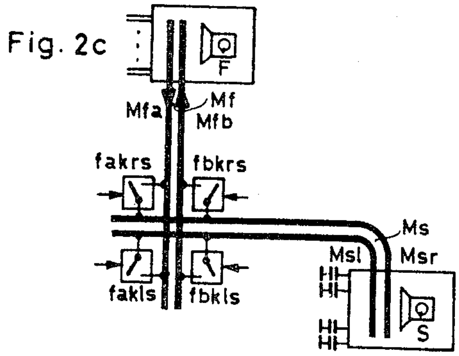

If the 4-wire multiplex line M*f* of a system F having lines leading to subscribers or to other central exchanges or the like, and the 4-wire multiplex line M*s* of a system S which has speech energy storers, instead of subscribers, which are connected twice per scanning period to their multiplex line M*s*, cross each other, then the coupling point, in accordance with FIG. 2*c* has a quad group of coupling point contacts *fakls, fbkls, fbkrs, fakrs*, one of which, at one of the two instants, is connected to the one diagonally located pair of coupling point contacts, and at the other instant to the other diagonally located pair of contacts. The speech energy transmitted at one instant from the subscriber of the system F, over the speech multiplex line M*fa* and, for instance, the coupling point contact *fakls*, to the speech energy storer of a pair of speech energy storers, which is connected to the one line M*sl*, is transmitted at the other instant from said speech energy storer, which is again connected to the line M*sl*, now over the coupling point *fbkls* and the receiving multiplex line M*fb*, to the other subscriber of this connection within the system F and vice versa.

Figure 2D:
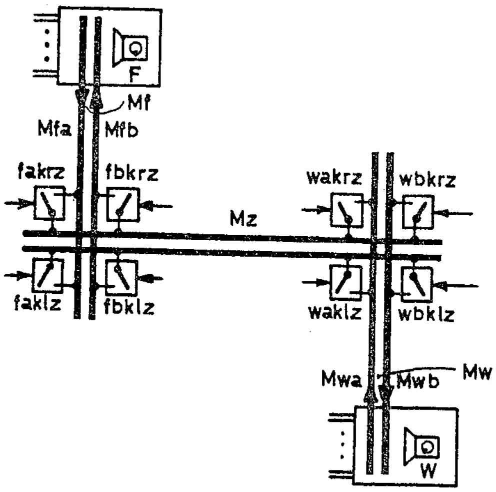

In similar manner, a coupling point has a quad group of contacts when the 4-wire multiplex lines M*f* and M*w* of the systems F and W, which are to be connected with each other, do not cross each other, but rather the connections are made via a special 4-wire multiplex line Mz which crosses the two 4-wire multiplex lines M*f* and M*w* which are to be connected together. Such coupling points are shown in FIG. 2*d*. In this case, upon making a connection, two diagonally opposite contacts at the two involved coupling points are closed, the two coupling point contacts lying on the one diagonal, for instance, the coupling point contacts *fakrz* and *fbklz* are closed at one coupling point, and at the other coupling point are closed the two coupling point contacts lying on the other diagonal, for instance, the coupling point contacts *wbkrz* and *waklz*, whereby the speech multiplex line of the system F is connected with the receiving multiplex line of the other system W, and conversely, the speech multiplx line of the other system W is connected with the receiving multiplex line of the first system F.

Changes may be made within the scope and spirit of the appended claims which define what is believed to be new and desired to have protected by Letters Patent.

We claim:

1. In a switching arrangement, over which is conducted the traffic of a plurality of time-division multiplex telephone communication system, each having a multiplex line to which the subscribers of the corresponding system are periodically connected in pulse-wise fashion, in each case by means of speech switches, said arrangement being constructed as a coupler which has both, first coupling point contacts for conducting traffic between different such time-division multiplex telephone communication systems, which first coupling point contacts are respectively associated with a combination pair of multiplex lines of said communication systems, as well as second coupling point contacts for conducting traffic within the individual time-division multiplex telephone communication systems, which second coupling point contacts are also associated with a combination pair of such a multiplex line, and a multiplex line of special time-division multiplex communication systems which have speech energy storers instead of subscribers; the improvement which comprises, disposed in the coupler, additional coupling point contacts which are connected with one terminal individually to one of the multiplex lines of the time-division multiplex telephone communication systems and with their other terminal in common to a special multiplex line, and further additional coupling point contacts which are connected with their one terminal in common to such a special multiplex line and with their other terminal individually to one of the multiplex lines of additional time-division multiplex communication systems which have trunk lines for outgoing and/or incoming traffic leading to other central exchanges or the like, over which additional coupling point contacts said traffic can be conducted by pulse-wise closure thereof to establish connections between the multiplex lines involved in calls.

2. A switching arrangement according to claim 1, comprising, disposed in the coupler, still further additional coupling point contacts which are connected with a combination pair of multiplex lines of the additional time-division multiplex communication systems having lines leading to other central exchanges or the like, so that by pulse-wise closure of one such further coupling point contact, traffic can be conducted between said additional time-division multiplex communication systems.

3. A switching arrangement according to claim 1, comprising, disposed in the coupler, still further additional coupling point contacts cooperating with combination pairs of multiplex lines including a first multiplex line of an additional time-division multiplex communication system having trunk lines leading to other exchanges or the like, and a second multiplex line of a special time-division multiplex communication system having speech energy storers instead of subscribers, over which further coupling point contacts traffic can be conducted within the additional time-division multiplex communication systems having trunk lines leading to other exchanges or the like.

4. A switching arrangement according to claim 1, wherein the coupling point contacts connected to one and the same multiplex line of a time-division multiplex communication system are actuated by means of code signals which serve as addresses and are periodically cycled in a cyclic storer, given ones of said coupling point contacts which are connected to two such multiplex lines being operatively considered only once.

5. A switching arrangement according to claim 4, wherein coupling point contacts connected to one and the same special multiplex line and to different telephone multiplex lines of time-division multiplex telephone communication systems are actuated by means of code signals serving as addresses and being periodically cycled in a cyclic storer.

6. A switching arrangement according to claim 4, wherein different coupling point contacts which are connected to the same multiplex line of a communication system are not actuated simultaneously.

7. A switching arrangement according to claim 6, wherein different coupling point contacts which are connected to the same special multiplex line are closed simultaneously only when they belong to the same telephone connection.

References Cited by the Examiner

UNITED STATES PATENTS 3,204,033 8/1965 Adelaar ------------- 179—15

DAVID G. REDINBAUGH, *Primary Examiner.*

R. L. GRIFFIN, *Assistant Examiner.*